(12) United States Patent  
Maeda et al.

(10) Patent No.: US 8,328,282 B2
(45) Date of Patent: Dec. 11, 2012

(54) SEAT STATE CHANGING APPARATUS

(75) Inventors: Misato Maeda, Kariya (JP); Kazuyuki Kashiwabara, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 302 days.

(21) Appl. No.: 12/858,878

(22) Filed: Aug. 18, 2010

(65) Prior Publication Data

US 2011/0043015 A1 Feb. 24, 2011

(30) Foreign Application Priority Data

Aug. 21, 2009 (JP) ................. 2009-192577

(51) Int. Cl.
*B60N 2/30* (2006.01)
*B60N 2/36* (2006.01)
(52) U.S. Cl. ..................................... 297/331
(58) Field of Classification Search .................. 297/15, 297/331, 332, 333, 334, 335, 336
See application file for complete search history.

(56) References Cited

U.S. PATENT DOCUMENTS

| | | | | |
|---|---|---|---|---|
| 5,779,308 A * | 7/1998 | Kim | ............................... | 297/336 |
| 7,109,677 B1 * | 9/2006 | Gagnon et al. | ............ | 297/331 X |
| 7,695,058 B2 * | 4/2010 | Satta et al. | ................ | 297/331 X |
| 7,802,490 B2 * | 9/2010 | Ingraham | ................... | 297/331 X |
| 8,052,194 B2 * | 11/2011 | Sayama | ...................... | 297/335 X |
| 8,141,930 B2 * | 3/2012 | Sayama | ...................... | 297/335 X |
| 8,186,753 B2 * | 5/2012 | Fujisawa et al. | .......... | 297/331 X |
| 2010/0019526 A1 | 1/2010 | Wada et al. | | |
| 2010/0117425 A1 * | 5/2010 | Abe et al. | ....................... | 297/335 |

FOREIGN PATENT DOCUMENTS

JP 5-096371 U 12/1993
JP 2008-207636 A 9/2008

* cited by examiner

*Primary Examiner* — Rodney B White
(74) *Attorney, Agent, or Firm* — Buchanan Ingersoll & Rooney PC

(57) ABSTRACT

A seat state changing apparatus changing seat states between a first state and a second state includes an actuator moving a seat between the first state and the second state, a change detection portion detecting a change according to a load applied to the seat when changing seat states, a determination portion determining that the seat is assumed to be a predetermined state when an amount of change in accordance with the change according to the load applied to the seat is greater than a predetermined determination threshold value, and a determination threshold value changing portion changing the predetermined determination threshold value when an engaging member, which is configured to engage with the seat, engages with the seat during a movement of the seat between the first state and the second state.

12 Claims, 5 Drawing Sheets

SEAT STATE CHANGING APPARATUS

CROSS REFERENCE TO RELATED APPLICATIONS

This application is based on and claims priority under 35 U.S.C. §119 to Japanese Patent Application 2009-192577, filed on Aug. 21, 2009, the entire content of which is incorporated herein by reference.

TECHNICAL FIELD

This disclosure relates to a seat state changing apparatus which changes states of a seat including a seat cushion and a seatback between a stored state and a seatable state.

BACKGROUND DISCUSSION

In recent years, a vehicle has been increased in size and a demand for vans has been increased. Some types of the vans include three-row seats in a vehicle compartment. The three-row seats include first row seats, second row seats, and third row seats. Generally, the first row seats correspond to a driver's seat and a front passenger's seat. The second row seats correspond to seats arranged behind the first row seats. The third row seats correspond to rearmost seats.

When there is a great number of occupants, the third row seats can be used as a sitting space. For the purpose of ensuring a greater luggage space at a rear of the vehicle compartment, the third row seats are folded down. A known technology which uses the third row seats as the sitting space and the luggage space is disclosed in JP2008-207636A (hereinafter referred to as Patent reference 1).

A vehicle seat disclosed in Patent reference 1 includes a seat cushion serving as a seat portion in a state where an occupant occupies the seat, and a seatback serving as a seatback portion in a state where the occupant occupies the seat. The vehicle seat is retained at a usable position when the occupant occupies the seat, and is retained at a stored position when intending to ensure the volume of the vehicle compartment. In the usable position, the seat cushion is retained at a position where the occupant enables to seat thereon and the seatback is retained at an upright position in which the seatback supports a back of the occupant. On the other hand, in the stored position, the seat cushion is retained at the stored position which is positioned at a rear-bottom of the usable position of the seat cushion. In the stored position, the seatback is retained at a forwardly folded position at which the seatback is arranged at a forward of the seat cushion moved to the stored position so that the seatback and the seat cushion are arranged one in front of the other.

Generally, a headrest, which protects a head of the occupant who seats on the seat from a load applied in a rearward direction of the vehicle, is provided at a top portion of the seatback of the vehicle seat. In a case of changing positional states of the seat cushion, the seatback, and the headrest from the seatable states to the stored states, it is convenient to change the positional states automatically using a motor. In general, the motor is provided at each of the seat cushion and the seatback so that the seat cushion and the seatback are operated individually. Further, the positional states of the headrest may be changed to the stored state by folding the headrest relative to the seatback upon a detection of the movement of the seat cushion to a predetermined position. The detection of the movement of the seat cushion to the predetermined position may be realized using an operational lever provided on a moving path of the seat cushion. That is, when moving the seat cushion to the stored position, the seat cushion activates the operational lever, thus to move the headrest to the stored position thereof.

Further, in a case where automatically changing the positional states of the seat cushion and the seatback, it is preferable to include an entrapment detector in order to prevent an object, or a part of occupant's body from being trapped between the seat cushion and the seatback. The entrapment detector judges whether the object or the part of occupant's body is entrapped based on results of comparison between a detected load and a predetermined threshold for the judgment. Considering the above case that the headrest is moved to the stored position in cooperation with the movement of the seat cushion, the load which is generated when the seat cushion activates the operational lever may be mistakenly judged as a load generated by entrapping the object or the part of occupant's body. Further, the load which the seatback receives when the headrest is folded to the seatback may be mistakenly judged as a load generated by entrapping the object or the part of occupant's body.

JPH05-96371U (hereinafter referred to as Patent reference 2) discloses a system which detects an entrapment of an object or a part of occupant's body at a windowpane of a vehicle. The system for a power window disclosed in Patent reference 2 detects the entrapment of the object or the part of occupant's body between the windowpane and a sash based on an opening or closing state of the window of the vehicle.

According to the system disclosed in Patent reference 2, a detected region is divided into five regions in accordance with the opening or closing state of the window. Reference values of the absolute speed and a relative speed of a motor, which serves as a judgment reference for detecting the entrapment of the object or the part of occupant's body are determined for each of the detected regions divided into five. In a case where the system disclosed in Patent reference 2 is applied to a seat state changing apparatus which changes seat states, high performance arithmetic processing unit is required because a complex control is required, which increases a manufacturing cost. If a low performance arithmetic processing unit is applied, the seat state changing apparatus to which the system disclosed in Patent reference 2 is applied may erroneously detect the entrapment of the object or the part of occupant's body.

A need thus exists for a seat state changing apparatus which is not susceptible to the drawback mentioned above.

SUMMARY

In light of the foregoing, the disclosure provides a seat state changing apparatus changing seat states between a first state and a second state, which includes an actuator moving a seat between the first state and the second state, a change detection portion detecting a change according to a load applied to the seat when changing seat states, a determination portion determining that the seat is assumed to be a predetermined state when an amount of change in accordance with the change according to the load applied to the seat is greater than a predetermined determination threshold value, and a determination threshold value changing portion changing the predetermined determination threshold value when an engaging member, which is configured to engage with the seat, engages with the seat during a movement of the seat between the first state and the second state.

According to another aspect of the disclosure, a seat state changing apparatus changing states of a seat including a seat cushion and a seatback between a stored state and a seatable state, includes a seat cushion actuator moving the seat cushion between the stored state and the seatable state, a seatback actuator moving the seatback between the stored state and the seatable state, a change detection portion detecting a change according to a load applied to at least one of the seat cushion and the seatback when changing seat states, an entrapment determination portion determining that at least one of the seat cushion and the seatback entraps an object or a part of occupant's body when an amount of change in accordance with the change according to the load applied to the seat is greater than a predetermined determination threshold value, a reaching detection portion detecting that at least one of the seat cushion and the seatback reaches a predetermined portion when changing the seat states, and a determination threshold value changing portion temporarily changing the predetermined determination threshold value for detecting whether at least one of the seat cushion and the seatback entraps the object or the part of occupant's body from when at least one of the seat cushion and the seatback reaches a predetermined position until a cooperating member, which changes states thereof in cooperation with at least one of the seat cushion and the seatback, starts moving.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

One embodiment will be explained with reference to illustrations of drawing figures as follows.

Figure 1:
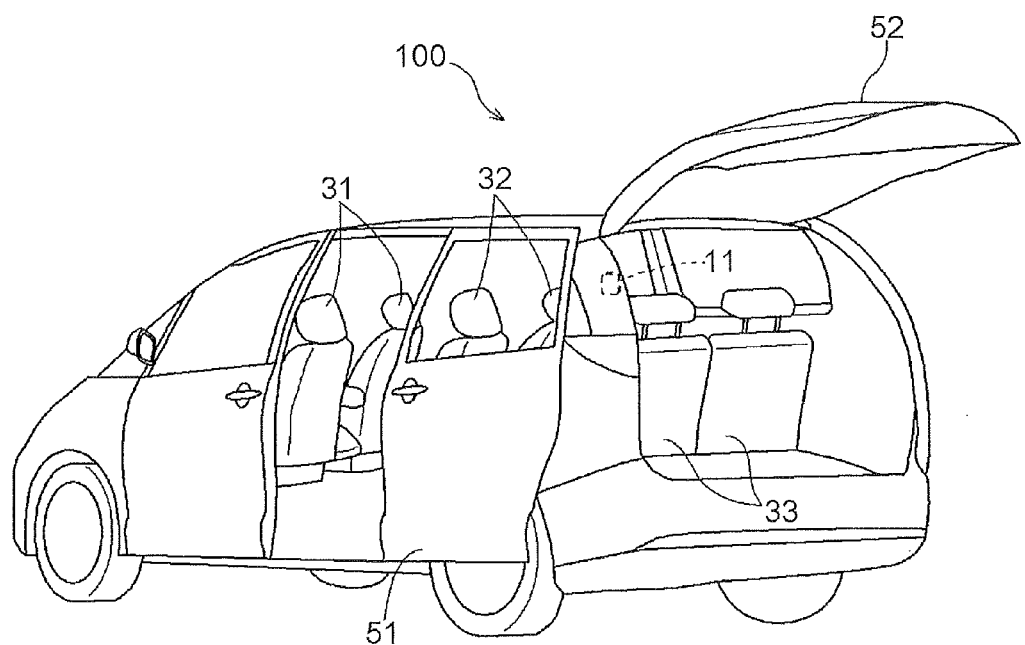
FIG. 1 is an oblique rear view of a vehicle to which a seat state changing apparatus is provided according to an embodiment disclosed here.

A seat state changing apparatus 1 according to the embodiment will be explained as follows. As shown in FIG. 1, the seat state changing apparatus 1 is configured to change states of a seat 2 including a seat cushion (i.e., serving as a seat block) 23 and a seatback (i.e., serving as a seat block) 22 to a stored state and a seatable state. According to the seat state changing apparatus 1, positions of each of the seat cushion 23 and the seatback 22 are individually changed. The stored state corresponds to a seat state which is suitable for accommodating large load. The seatable state corresponds to a seat state which is suitable for seating an occupant.

A vehicle 100 shown in FIG. 1 shows a state that a sliding door 51 provided at a left side portion of the vehicle 100 and a hatchback door 52 provided at a back portion of the vehicle 100 are open. The vehicle 100 is a van type vehicle which includes three-row seats within its vehicle compartment. The three-row seats include first row seats 31, second row seats 32, and third row seats 33. The first row seats 31 correspond to a driver's seat and a front passenger's seat. The second row seats 32 correspond to seats positioned behind the first row seats 31. The third row seats 33 correspond to seats provided at a rearmost of the vehicle 100. For an explanatory purpose, a case in which the seat state changing apparatus 1 changes states of the third-row seats 33 will be explained.

Figures 2A, 2B:
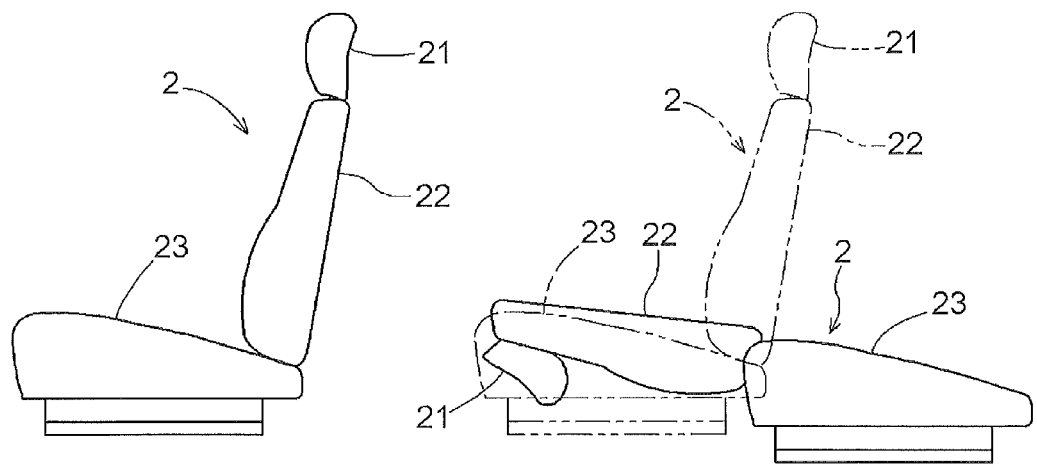
FIG. 2A is a lateral view of a seat in a seatable state according to the first embodiment.
FIG. 2B is a lateral view of the seat in a stored state according to the first embodiment.

As explained above, the seat 2 includes the seatback 22 and the seat cushion 23. Further, as shown in FIGS. 2A and 2B, the seat 2 includes a headrest 21. The headrest 21 is configured to protect a head portion of an occupant who occupies the seat 2 from a load applied in a rearward direction of the vehicle in the seatable state of the seat 2. The seatback 22 is configured to enable the occupant to lean back therein. The seat cushion 23 is configured to support a posterior of the occupant of the seat 2.

In the seatable state, as shown in FIG. 2A, the seatback 22 and the headrest 21 are arranged to be in an upright position relative to the seat cushion 23. Thus, in the seatable state, the occupant is able to seat in the seat cushion 23 and lean back in the seatback 22 and the headrest 21. On the other hand, in the stored state, as shown in FIG. 2B, the headrest 21 is folded to the seatback 22, the seat cushion 23 slides rearwardly, and the seatback 22 is folded down forwardly to the position of the seat cushion 23 in the seatable state. Accordingly, the seatback 22 and the seat cushion 23 are arranged to be in a substantially flat state to ensure a space for loading a large load, or luggage.

Operations of the third-row seats 33 of the seat 2 to the seatable state or to the stored state are performed by operating an operational switch 11. The operational switch 11 is provided at a rear portion of the third-row seats 33 in the vehicle compartment, that is, at a pillar in a luggage compartment as shown in FIG. 1 (i.e., left portion in the luggage compartment in FIG. 1). The operational switch 11 is operated by a user who intends to change states of the seat 2.

Figure 3:
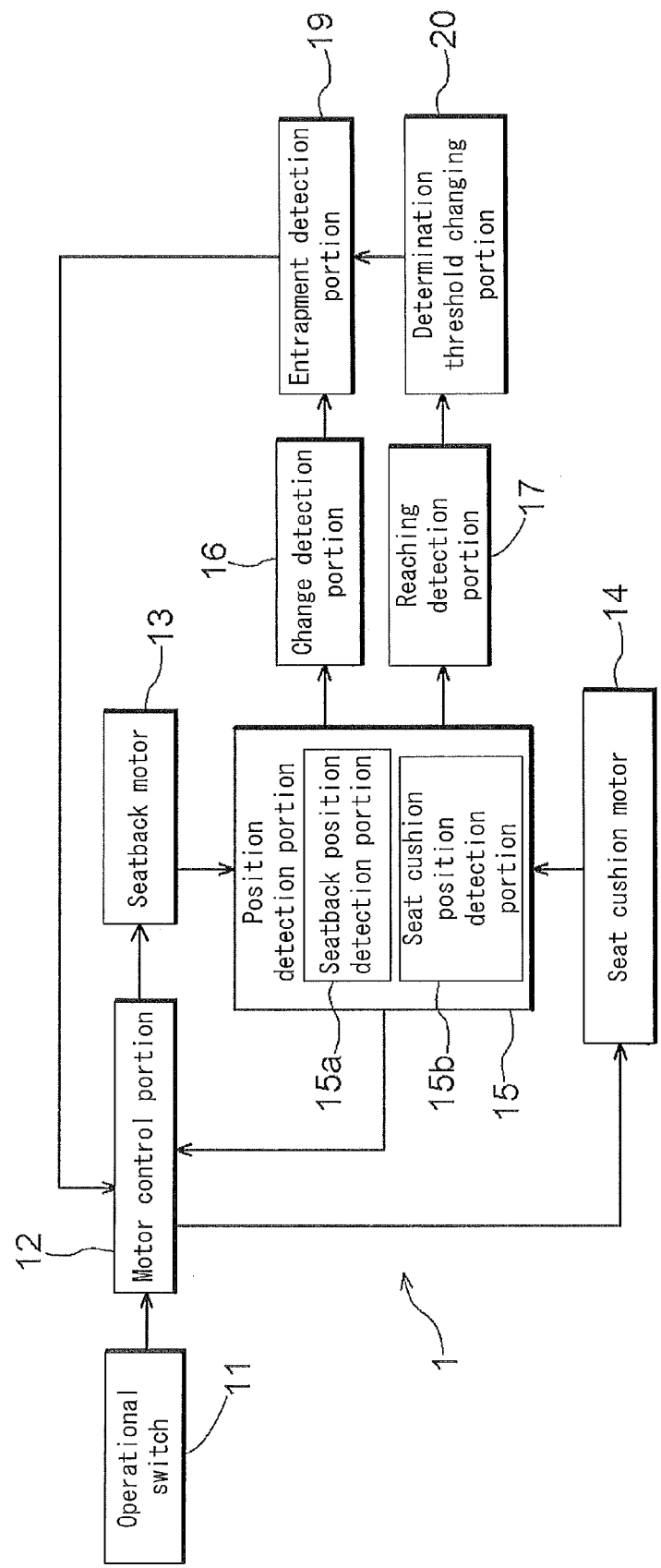
FIG. 3 is a block diagram showing a schematic structure of the seat state changing apparatus.

As shown in FIG. 3, the seat state changing apparatus 1 includes the operational switch 11, a motor control portion 12, a seatback motor 13, a seat cushion motor 14, a position detection portion 15, a change detection portion 16, a reaching detection portion 17, an entrapment determination portion (i.e., determination portion) 19, and a determination threshold changing portion 20. A system for performing the foregoing various transactions for changing states of the seat 2 utilizing a CPU as a main member of the seat state changing apparatus 1 is structured with either a hardware or a software or both of the hardware and the software.

The operational switch 11 is mounted within the luggage compartment of the vehicle 100 as explained above. By operating the operational switch 11, the user enables to change states of the seat 2 between the stored state and the seatable state. Upon the operation of the operational switch 11 by the user, a signal indicating that an operation to move the seat 2 either to the stored state or to the seatable state is transmitted to the motor control portion 12 which will be explained in detail hereinafter.

The seat cushion motor (i.e., serving as an actuator for a seat cushion) 14 moves the seat cushion 23 between a stored position and a seatable position. The seatable position of the seat cushion 23 is a position in which an occupant is able to seat thereon, and corresponds to a position of the seat cushion 23 illustrated in FIG. 2A. The stored position of the seat cushion 23 corresponds to a position indicated with a solid line which is at a lower rear position relative to the seatable position of the seat cushion 23 which is indicated with a dotted line in FIG. 2B. The seat cushion motor 14 moves the seat cushion 23 between the stored position and the seatable position defined above.

The seatback motor (i.e., serving as an actuator for a seatback) 13 moves the seatback 22 between a stored position and a seatable position. The seatable position of the seatback 22 is a position at which the occupant is retained at the seatback 22 to be leaning back thereto and corresponds to a position of the seatback 22 indicated in FIG. 2A. The stored state of the seatback 22 corresponds to a position of the seatback 22 shown in FIG. 2B. The seatback motor 13 moves the seatback 22 between the stored position and the seatable position defined above.

The position detection portion 15 includes a seatback position detection portion 15a and a seat cushion position detection portion (i.e., serving as a state change detection portion) 15b. In those circumstances, the seat state changing apparatus 1 does not include a position detection sensor which detects the positions of the seatback 22 and the seat cushion 23. The seat state changing apparatus 1 identifies the positions of the seatback 22 and the seat cushion 23 based on pulse signals outputted in accordance with rotations of the seatback motor 13 and the seat cushion motor 14 which change the positions of the seatback 22 and the seat cushion 23, respectively. Accordingly, the seatback position detection portion 15a detects the current position of the seatback 22 based on the operation of the seatback motor 13. Further, the seat cushion position detection portion 15b detects the current position of the seat cushion 23 based on the operation of the seat cushion motor 14.

The seatback position detection portion 15a and the seat cushion position detection portion 15b compute a pulse number of the pulse signals outputted in accordance with the rotations of the seatback motor 13 and the seat cushion motor 14. Thus, a displacement amount of the seatback 22 and the seat cushion 23 from starting position can be identified. A time period in which a Hi level pulse signal is transmitted from each of the seatback motor 13 and the seat cushion motor 14 in a state where the seatback 22 and the seat cushion 23 reach a corresponding mechanical end portion (i.e., end portions, or points in a movable range beyond which the seatback 22 and the seat cushion 23 do not move) is determined to be longer compared to a time period in which Hi level pulse signal is transmitted from each of the seatback motor 13 and the seat cushion motor 14 in a state where the seatback 22 and the seat cushion 23 has not reached the corresponding mechanical end portion. Accordingly, the seatback position detection portion 15a and the seat cushion position detection portion 15b compute the time period in which the Hi level pulse signal is transmitted from each of the seatback motor 13 and the seat cushion motor 14 in addition to computing the pulse number of the pulse signals. The pulse number and the time period in which Hi level pulse signal is transmitted from each of the seatback motor 13 and the seat cushion motor 14 computed by the seatback position detection portion 15a and the seat cushion position detection portion 15b are transmitted to the motor control portion 12.

As illustrated in FIG. 2B, at least a portion of the stored position (i.e., indicated with the solid line) of the seatback 22 and the seatable position (i.e., indicated with the dotted line) of the seat cushion 23 overlap each other. Accordingly, in a case of moving the seatback 22 and the seat cushion 23, the seatback 22 and the seat cushion 23 interfere with each other. The interference of the movement of the seatback 22 and the seat cushion 23 is generated in an interference region defined based on a positional relationship between the seatback 22 and the seat cushion 23 (see FIG. 4).

Figure 4:
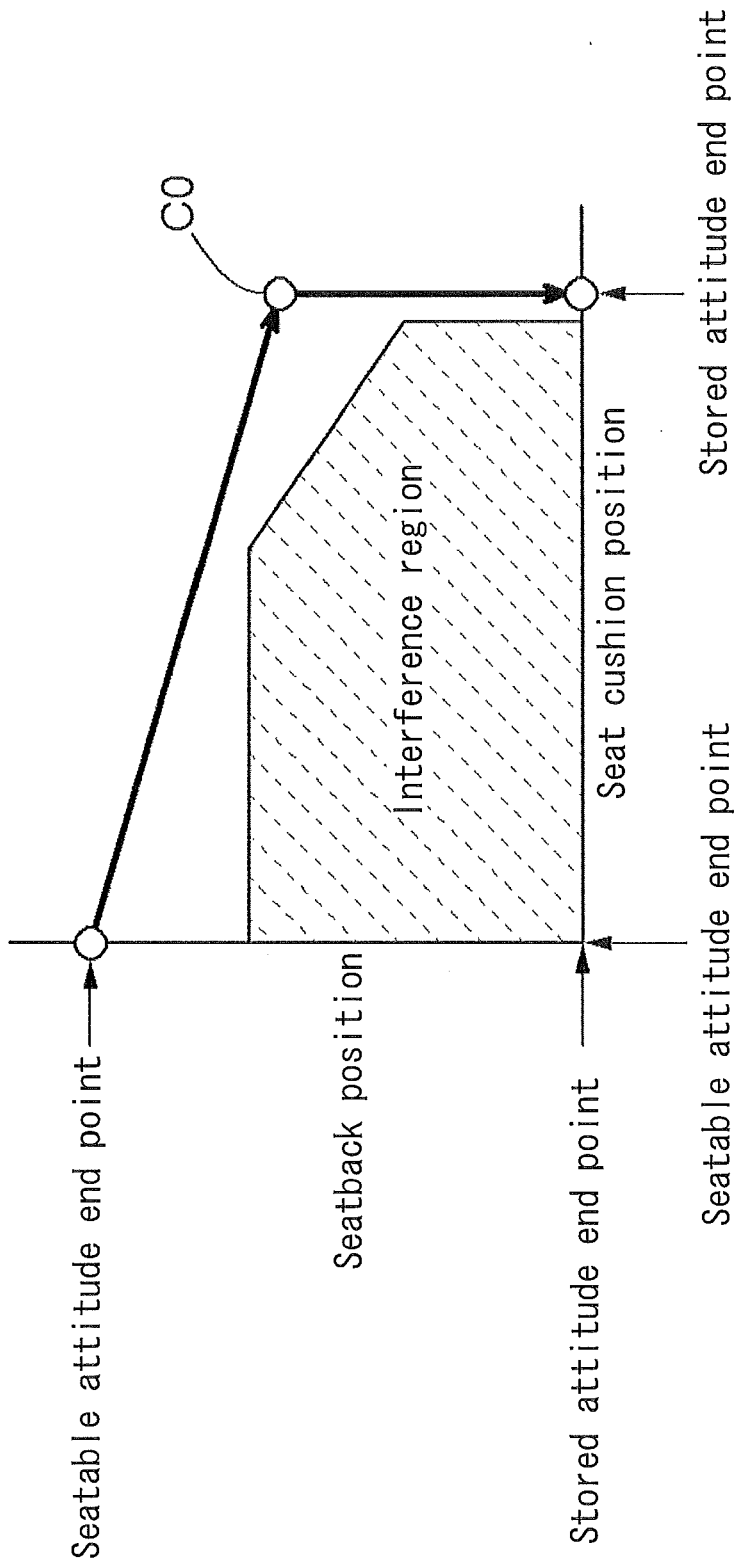
FIG. 4 is a view showing an interference region when changing seat states.

FIG. 4 shows the interference region and a moving path for a control when changing the states of the seat 2 from the seatable state to the stored state. An interference region is also defined in a case where the states of the seat 2 are changed from the stored state to the seatable state. However, because there is no substantial difference between when changing the seat state from the seatabe state to the stored state and when changing the seat state from the stored state to the seatable state, for an explanatory purpose, a case where the seat 2 is moved from the seatable state to the stored state will be explained as follows. In FIG. 4, a vertical axis shows a position of the seatback 22, and a horizontal axis shows a position of the seat cushion 23. Accordingly, coordinates in FIG. 4 correspond to a state of the seat 2. A seatable attitude end point and a stored attitude end point are indicated on each of the vertical axis and the horizontal axis. The seatable attitude end point corresponds to an end point when the seatback 22 or the seat cushion 23 moves in a direction of seatable position. The stored attitude end point corresponds to an end point when the seatback 22 or the seat cushion 23 moves in a stored position direction.

In a case where the seat 2 is in the seatable state, as shown in FIG. 4, the seatback 22 and the seat cushion 23 are positioned at the seatable attitude end point. In a case where the seat 2 is changed to the stored state from the seatable state, the seat state changing apparatus 1 moves the seat 2 to a relay point (transit point) CO so that moving paths of the seatback 22 and the seat cushion 23 do not enter the interference region, thereafter, to the stored attitude end point.

The seat state of the seat 2, that is, the states of the seat cushion 23 and the seatback 22 are changed automatically by individual operations of the seatback motor 13 and the seat cushion motor 14, respectively. The seat state changing apparatus 1 is configured not to entrap an object or a part of occupant's body during the transition by the automatic changes of the positions of the seat cushion 23 and the seatback 22.

When at least one of the seat cushion 23 and the seatback 22 receives a load when changing the seat state of the seat 2, the change detection portion 16 detects a change in the pulse signal in accordance with the applied load. The load, which at least one of the seat cushion 23 and the seatback 22 receives, is a load detected because an object or a part of occupant's body is entrapped by the seat cushion 23 or the seatback 22. The changes in the pulse signal in accordance with the applied load correspond to changes in levels of the load applied to the seat cushion 23 and the seatback 22. The change detection portion 16 detects each of a load applied to the seat cushion 23 and the seatback 22 separately.

The change detection portion 16 detects the change in the levels of the load applied to the seat cushion 23 and the seatback 22 based on the pulse signal detected by the position detection portion 15. A time keeping the Hi level of the pulse signal (a time duration of the Hi-level pulse signal) when an object or a part of occupant's body is entrapped by the seat cushion 23 or the seatback 22 is assumed to be longer than a time keeping a Hi level of the pulse signal (a time duration of the Hi-level pulse signal) when there is no entrapped object or part of occupant's body. Further, motor rotation speed of the motor which is associated with the entrapped object or part of occupant's body declines. The change detection portion 16 detects the foregoing changes. The changes detected by the change detection portion 16 are transmitted to the entrapment determination portion 19 explained in details hereinafter.

The entrapment determination portion 19 determines that an object or a part of occupant's body is entrapped when an amount of change (e.g., amount of changes in a time duration of the Hi-level pulse signal) according to the changes (e.g., changes in an applied load) is greater than a predetermined determination threshold. The amount of change according to the changes corresponds to an amount of change of the changes detected by the change detection portion 16. The predetermined determination threshold corresponds to a determination threshold value which is used for determining whether the object or part of occupant's body is entrapped, and a determination threshold value for detecting the entrapment by the seatback 22 and a determination threshold value for detecting the entrapment by the seat cushion 23 are pre-memorized in the entrapment determination portion 19. The entrapment determination portion 19 determines that the object or part of occupant's body is entrapped when the amount of change is greater than the determination threshold value. On the other hand, when the amount of change is equal to or less than the determination threshold value, the entrapment determination portion 19 determines that no object or part of occupant's body is entrapped. In those circumstances, among the changes transmitted from the change detection portion 16, the changes because of the movement of the seatback 22 and the changes because of the movement of the seat cushion 23 are separately transmitted. Accordingly, the entrapment determination portion 19 specifies that the object or part of occupant's body is entrapped, or caught by either one of or both of the seatback 22 and the seat cushion 23.

A headrest 21 is provided on a top portion of the seatback 22. According to the embodiment, a motor which changes a state of the headrest 21 is not provided, and the state of the headrest 21 is changed in response to the movement of the seat cushion 23. That is, when the seat state of the seat 2 is changed from the seatable state to the stored state, the headrest 21 is configured to start moving to a stored position in cooperation with the seat cushion 23 when the seat cushion 23 reaches a first predetermined position (i.e., a trigger position). According to this embodiment, in a case where the seat state of the seat 2 is changed from the stored state to the seatable state, the headrest 21 does not move in cooperation with the seat cushion 23, and the headrest 21 must be moved back to the seatable position manually.

Figure 5:
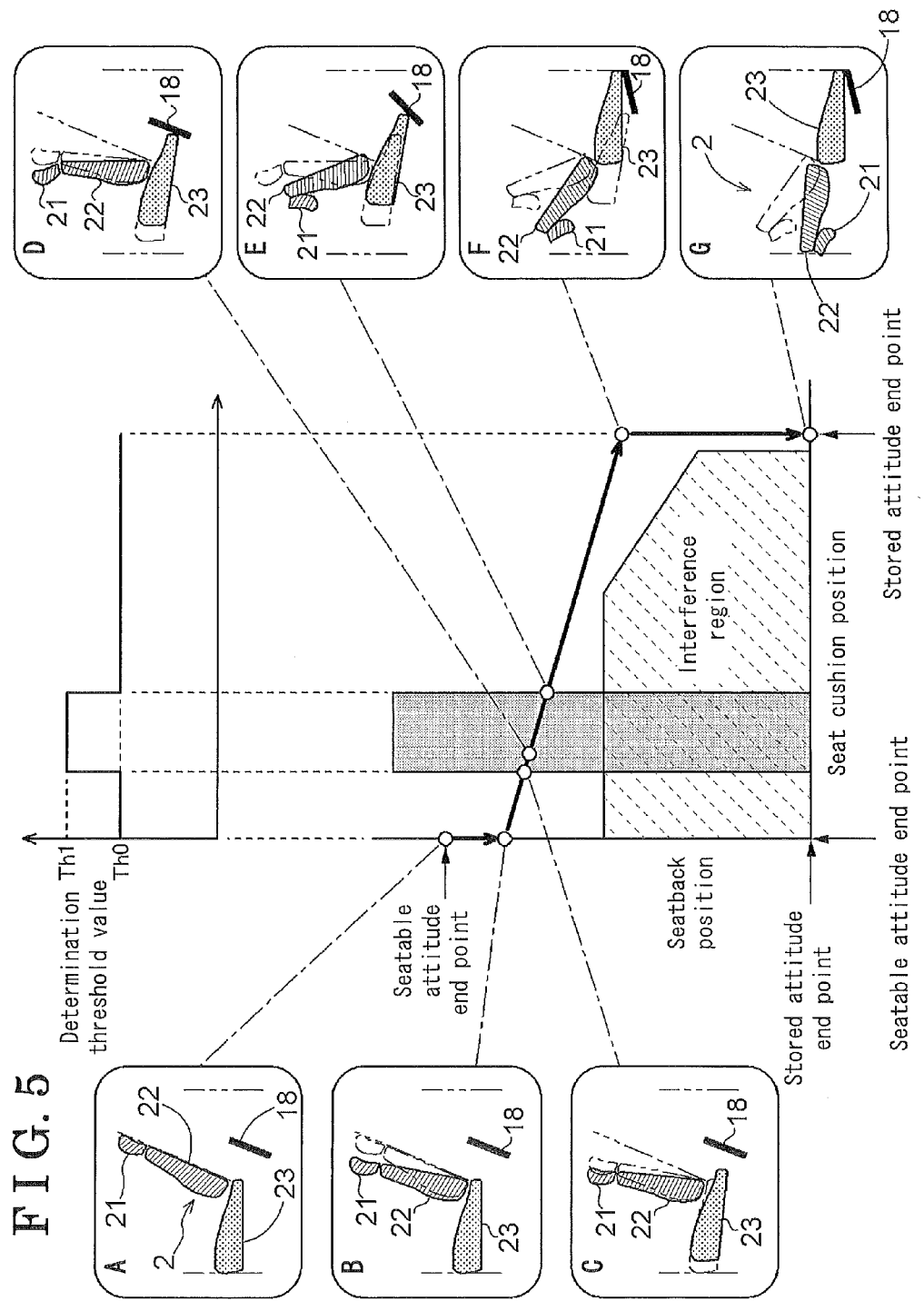
FIG. 5 is a view showing transitions of seat state changes performed by the seat state changing apparatus.

The seat state changing apparatus 1 includes a trigger position reaching detection portion (i.e., also serving as an engaging member; operational lever) 18 which detects that the seat cushion 23 reaches the first predetermined position (i.e., trigger position) as shown in FIG. 5. The trigger position reaching detection portion 18 detects that the seat cushion 23 reaches the trigger position, which serves as a trigger to start moving a cooperating member changing its states in cooperation with the seat cushion 23. The cooperating member changing its state in cooperation with the seat cushion 23 according to the embodiment corresponds to the headrest 21. The trigger position which serves as a trigger to start moving the headrest 21 is provided on a moving path of the seat cushion 23 and corresponds to a position at which the headrest 21 starts moving when the seat cushion 23 reaches the first predetermined position. More particularly, for example, an operational lever provided on the moving path of the seat cushion 23 may serve as the trigger position reaching detection portion 18. Applying the operational lever serving as the trigger position reaching detection portion 18, in a case where the seat cushion 23 pushes the operational lever 18, the headrest 21 starts moving (i.e., the seat cushion 23 pushes the operational lever 18 to trigger the headrest 21 to start folding).

In a case where the seat cushion 23 pushes the operational lever, there is a possibility that a load is applied to the seat cushion 23. Further, in a case where the headrest 21 is folded to the seatback 22, a load may be applied to the seatback 22. The load applied to the seat cushion 23 or the seatback 22 is detected by the change detection portion 16, and the entrapment determination portion 19 may determine that the seat cushion 23 or the seatback 22 entraps, or catches an object or a part of occupant's body when a level of the detected load is greater than the predetermined determination threshold value. In those circumstances, the seat state changing apparatus 1 discontinues the movement of the seat cushion 23 and the seatback 22. That is, the foregoing detection is an erroneous detection. The seat state changing apparatus 1 according to the embodiment is configured to prevent the foregoing erroneous detection, or erroneous determination.

The reaching detection portion 17 detects that the seat cushion 23 reaches a second predetermined position when a seat state is changed. The change of the seat state corresponds to a changing process of seat states of the seat 2. The second predetermined position is defined as at least an upstream position relative to the trigger position which is detected by the trigger position reaching detection portion 18 on the moving path of the seat cushion 23. The reaching detection portion 17 detects that the seat cushion 23 reaches a position at an upstream of the trigger position. The detected result is transmitted to the determination threshold changing portion 20. The reaching detection portion 17 detects that the seat cushion 23 reaches the second predetermined position based on a pulse signal transmitted from the seat cushion position detection portion 15*b*. That is, pulse number of the outputted pulse signal for moving the seat cushion 23 from the seatable position to the second predetermined position is predetermined, and the reaching detection portion 17 detects that the seat cushion 23 reaches the second predetermined position by computing the pulse signal obtained when the seat cushion 23 actually moves from the seatable position to the stored position. Thus, according to the construction of the embodiment, a load is not generated with respect to detection that the seat cushion 23 reaches the second predetermined position. Accordingly, erroneous detections, or erroneous determination for the entrapment are avoided. In a case where the reaching detection portion 17 detects that the seat cushion 23 reaches the second predetermined position, a signal indicating that the seat cushion 23 reaches the second predetermined position is transmitted to the determination threshold changing portion 20.

The determination threshold changing portion 20 temporarily changes the predetermined determination threshold value for the detection of the seat cushion 23 and the seatback 22 from when the seat cushion 23 reaches the second predetermined position until the headrest 21 at least starts moving. The reaching detection portion 17 detects that the seat cushion 23 reaches the second predetermined position. The second predetermined position is provided on the moving path positioned at an upstream of the trigger position (i.e., first predetermined position) where the headrest 21 starts moving. The determination threshold value for the detection of the entrapment of the seat cushion 23 and the seatback 22 is pre-memorized in the entrapment determination portion 19. The temporal change of the predetermined determination threshold value indicates that the determination threshold changing portion 20 temporarily changes the predetermined determination threshold value at least from detecting that the seat cushion 23 reaches the second predetermined position by the reaching detection portion 17 until the detection result that the seat cushion 23 reaches the trigger position (i.e., first predetermined position) is transmitted. Accordingly, the determination threshold changing portion 20 temporarily changes the determination threshold value which is pre-memorized in the entrapment determination portion 19 at least from the detection by the reaching detection portion 17 that the seat cushion 23 reaches the second predetermined position until the detection by the trigger position reaching detection portion 18 that the seat cushion 23 reaches the trigger position.

The temporal change of the determination threshold value may be defined until the headrest 21 is stored. That is, the determination threshold changing portion 20 may temporarily change the determination threshold value at least from detecting that the seat cushion 23 reaches the second predetermined position until the state change of the headrest 21 is completed. In those circumstances, as explained above, the headrest 21 does not include a motor which operates to change the position, or state of the headrest 21. Accordingly, the time period until the state change of the headrest 21 is completed is predefined by pulse number, or the like, of the pulse signal which is obtained after the headrest 21 starts moving, or by a time elapsed after the headrest 21 starts moving.

Further, the determination threshold changing portion 20 re-changes the temporarily changed threshold value to the predetermined determination threshold value after completing the movement of the headrest 21. That is, after the completion of the movement of the headrest 21, the seat cushion 23 does not push the operational lever or the headrest 21 is not folded to the seatback 22. Accordingly, the determination threshold changing portion 20 re-changes the temporarily changed threshold value to the predetermined determination threshold value which is pre-memorized in the entrapment determination portion 19 so that a normal entrapment is assumed to be detectable. According to the foregoing construction, the seat state changing apparatus 1 detects the entrapment of an object, or a part of occupant's body while changing the seat state of the seat 2, and properly changes the positional state of the headrest 21 without erroneous detection.

A transition from the seatable state to the stored state of the seat 2 will be explained with reference to FIG. 5. In a case where the seat 2 is in the seatable state, both of the seatback 22 and the seat cushion 23 are positioned at the seatable attitude end points as illustrated in State A in FIG. 5. In the meantime, FIG. 5 shows the determination threshold value which is changed in accordance with the position of the seat cushion 23 and is applied for the detection of the entrapment of an object, or a part of occupant's body. In those circumstance, the determination threshold value which is pre-memorized in the entrapment determination portion 19 is defined as determination threshold value Th0. The determination threshold value Th0 may be separately determined for the detection of entrapment at the seatback 22 and the detection of entrapment at the seat cushion 23. However, for an explanatory purpose, the same determination threshold value Th0 is applied to both of the detection of entrapment at the seatback 22 and the detection of entrapment at the seat cushion 23 according to this embodiment.

First, only the seatback 22 of the seat 2 moves from the state illustrated in State A in FIG. 5 thus to be a state shown in State B in FIG. 5. The determination threshold value Th0 is applied in this state because the seat cushion 23 has not moved. Thereafter, the seat cushion 23 is moved together with the seatback 22 from the state shown in State B in FIG. 5, and that the seat cushion 23 reaches the second predetermined position is detected by the reaching detection portion 17 as shown in State C in FIG. 5.

Upon the detection by the reaching detection portion 17 that the seat cushion 23 reaches the second predetermined position, the determination threshold changing portion 20 temporarily changes the determination threshold value Th0 which is pre-memorized in the entrapment determination portion 19 to the determination threshold value Th1 which is greater than the determination threshold value Th0. Thereafter, the determination threshold value Th1 is applied for the detection of the entrapment. Then, the seat cushion 23 is moved and that the seat cushion 23 reaches the position to fold the headrest 21 is detected by the trigger position reaching detection portion 18 (e.g., operational lever). Accordingly, the headrest 21 starts folding inwards as illustrated in State D in FIG. 5.

Thereafter, when the movement of the headrest 21 to the stored position is completed as shown in State E in FIG. 5, the determination threshold changing portion 20 re-changes the determination threshold value Th1 to the determination threshold value Th0 which is pre-memorized in the entrapment determination portion 19. Thus, thereafter, the determination threshold value Th0 is applied for the detection of the entrapment. The seat cushion 23 is moved to the stored attitude end point as illustrated in State F in FIG. 5, and then the seatback 22 is moved to the stored attitude end point as illustrated in State G in FIG. 5. As explained above, the determination threshold value is changed in accordance with the state change of the seat 2.

Figure 6:
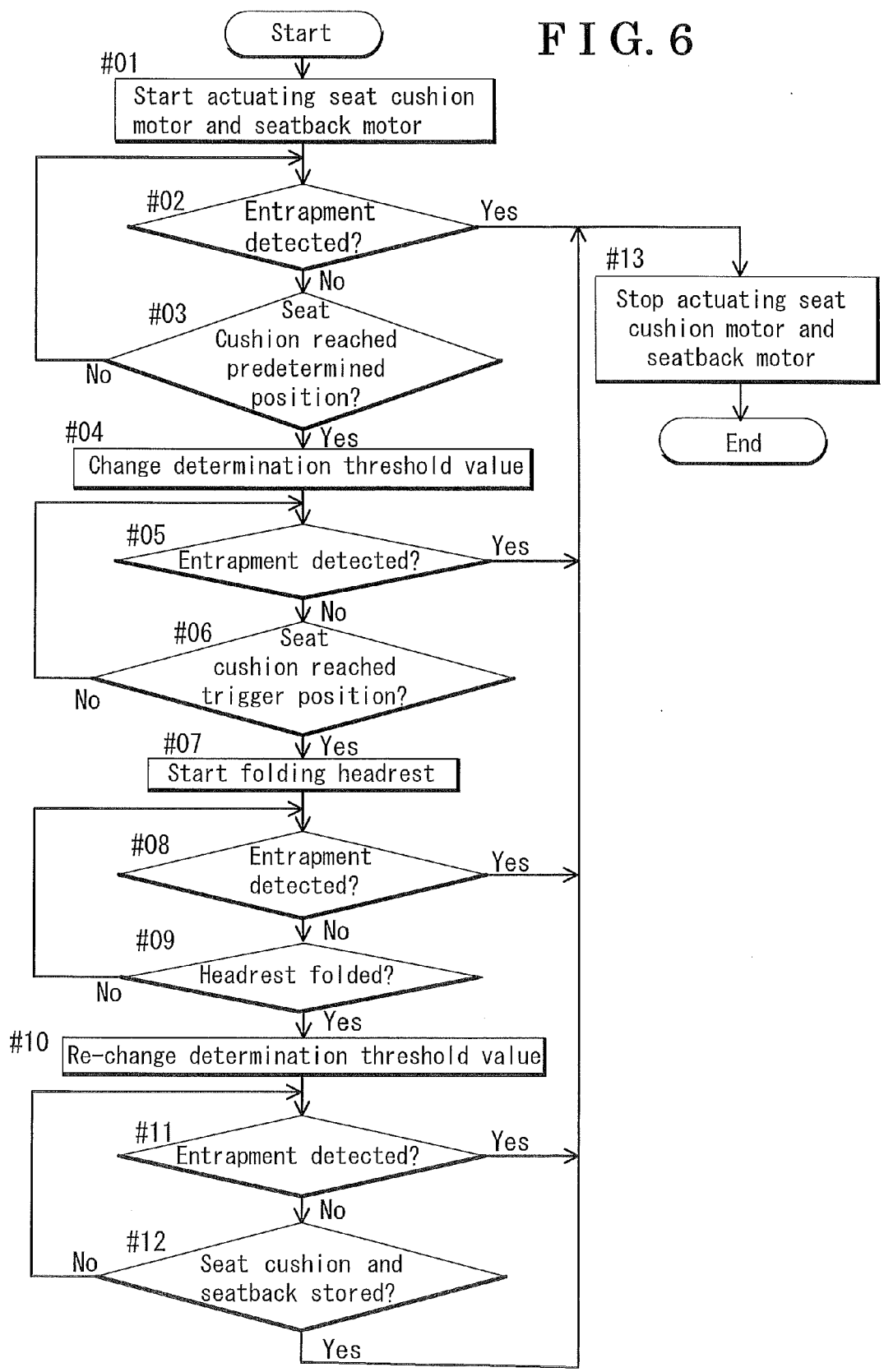
FIG. 6 is a flowchart showing a transaction performed by the seat state changing apparatus.

A transaction for changing the seat state of the seat 2 by the seat state changing apparatus 1 will be explained with reference to a flowchart illustrated in FIG. 6. First, according to the seat state changing apparatus 1, when the operational switch 11 is operated, the motor control portion 12 starts controlling the seatback motor 13 and the seat cushion motor 14 (Step #01).

During the operations of the seat cushion motor 14 and the seatback motor 13, whether an object or a part of occupant's body is entrapped is determined by the entrapment determination portion 19. When it is determined that an object or a part of occupant's body is entrapped at at least one of the seat cushion 23 and the seatback 22 (Yes at Step #02), the motor control portion 12 controls the seat cushion motor 14 and the seatback motor 13 to stop (Step #13) and to end the transaction.

At Step #02, when the object, or the part of the occupant's body is not entrapped by the seat cushion 23 and/or the seatback 22 (i.e., No at Step #02) and when the seat cushion 23 has not reached the second predetermined position (i.e., No at Step #03), the transaction returns to Step #02 to continue further transactions. On the other hand, when it is detected that the seat cushion 23 reaches the second predetermined position (i.e., Yes at Step #03), the determination threshold changing portion 20 changes the determination threshold value Th0 which is predetermined in the entrapment determination portion 19 (Step #04) to the determination threshold value Th1.

In those states, the motor control portion 12 continues the operation of the seat cushion motor 14 and the seatback motor 13. In a case where the entrapment determination portion 19 detects the entrapment of the object or the part of occupant's body in those continuing operations of the seat cushion motor 14 and the seatback motor 13 (i.e., Yes at Step #05), the motor control portion 12 stops the operations of the seat cushion motor 14 and the seatback motor 13 (Step #13) to end the transaction. When the entrapment determination portion 19 detects the entrapment of the object or the part of occupant's body as foregoing, the determination threshold value TH1 which is changed by the determination threshold changing portion 20 is applied.

On the other hand, in a case where the entrapment determination portion 19 does not detect the entrapment of the object or the part of occupant's body in the continuing operations of the seat cushion motor 14 and the seatback motor 13

(i.e., No at Step #05), whether the seat cushion 23 reaches the trigger position is detected by the trigger position reaching detection portion 18. In a case where the seat cushion 23 does not reach the trigger position (i.e., No at Step #06), the transaction returns to Step #05 to continue further transactions. On the other hand, in a case where the seat cushion 23 reaches the trigger position (i.e., Yes at Step #06), the headrest 21 starts folding (Step #07).

In those states, the motor control portion 12 continues the operation of the seat cushion motor 14 and the seatback motor 13. In a case where the entrapment determination portion 19 detects the entrapment of the object or the part of occupant's body in those continuing operations of the seat cushion motor 14 and the seatback motor 13 (i.e., Yes at Step #08), the motor control portion 12 stops the operations of the seat cushion motor 14 and the seatback motor 13 (Step #13) to end the transaction. When the entrapment determination portion 19 detects the entrapment of the object or the part of occupant's body as foregoing, the determination threshold value TH1 which is changed by the determination threshold changing portion 20 is applied.

On the other hand, when the entrapment determination portion 19 does not detect the entrapment of the object or the part of occupant's body in the continuing operations of the seat cushion motor 14 and the seatback motor 13 (i.e., No at Step #08), whether folding operation of the headrest 21 is completed is detected to be confirmed. The completion of the folding operation of the headrest 21 is confirmed by detecting whether a predetermined time has elapsed or a predetermined pulse signal is detected, or the like. In a case where the folding operation of the headrest 21 is not completed (i.e., No at Step #09), the transaction returns to Step #08 to continue further transactions. On the other hand, in a case where the folding operation of the headrest 21 is completed (i.e., Yes at Step #09), the determination threshold changing portion 20 re-changes the determination threshold value Th1 which is used for the determination of the entrapment by the entrapment determination portion 19 to the determination threshold value Th0 which is pre-memorized in the entrapment determination portion 19 (Step #10). Accordingly, the determination threshold value Th0 which is pre-memorized in the entrapment determination portion 19 is applied for the determination of the entrapment thereafter.

In those states, the motor control portion 12 continues the operation of the seat cushion motor 14 and the seatback motor 13. In a case where the entrapment determination portion 19 detects the entrapment of the object or the part of occupant's body in those continuing operations of the seat cushion motor 14 and the seatback motor 13 (i.e., Yes at Step #11), the motor control portion 12 stops the operations of the seat cushion motor 14 and the seatback motor 13 (Step #13) to end the transaction.

On the other hand, when the entrapment determination portion 19 does not detect the entrapment of the object or the part of occupant's body in the continuing operations of the seat cushion motor 14 and the seatback motor 13 (i.e., No at Step #11), whether the seat cushion 23 and the seatback 22 completes the positional state changes to the stored state is detected to be confirmed. In a case where the positional state changes of the seat cushion 23 and the seatback 22 to the stored state is completed (i.e., Yes at Step #12), the motor control portion 12 stops the operations of the seat cushion motor 14 and the seatback motor 13 (Step #13) to end the transaction. On the other hand, in a case where the positional state changes of the seat cushion 23 and the seatback 22 to the stored state is not completed (i.e., No at Step #12), the transaction returns to Step #11 to continue further transactions.

According to the embodiment, the seat state changing apparatus 1 detects whether an object, or a part of occupant's body is entrapped while changing the state of the seat 2 following the processes explained above.

Modified examples of the embodiment will be explained hereinafter. According to the embodiment, the cooperating member which changes its positional state in cooperation with the seat cushion 23 corresponds to the headrest 21. However, the construction of the cooperating member is not limited to the headrest 21. For example, in a case where the seat 2 is provided with an ottoman (i.e., a stool on which an occupant places his/her feet and/or legs), the ottoman serves as the cooperating member which cooperates with the seat cushion 23. Alternatively, both of the ottoman and the seat cushion 23 may serve as the cooperating member which cooperates with the seat cushion 23.

According to the embodiment, for an explanatory purpose, a case where positional states of the seat 2 are changed from the seatable state to the stored state is disclosed. However, the construction and operations of the seat state changing apparatus 1 is not limited to the foregoing. The seat state changing apparatus 1 disclosed here is applicable to a case where states of the seat 2 are changed from the stored state to the seatable state.

According to the embodiment, the determination threshold value changing portion 20 is configured to temporarily change the determination threshold value at least after detecting that the seat cushion 23 reaches the second predetermined position which is positioned at upstream of the trigger position (i.e., first predetermined position) on the moving path of the seat cushion 23 until the states change of the headrest 21 is completed. However, the construction of the seat state changing apparatus 1 disclosed here is not limited to the foregoing construction. That is, the determination threshold value changing portion 20 may be configured to change the determination threshold value when the seat cushion 23 reaches the trigger position.

According to the embodiment, the reaching detection portion 17 detects that the seat cushion 23 reaches the second predetermined position during the state change of the seat 2, and the determination threshold value changing portion 20 temporarily changes the predetermined threshold value at least from when the seat cushion 23 reaches the second predetermined position at least until the cooperating member (e.g., headrest member 21) starts moving. However, the construction of the seat state changing apparatus 1 is not limited to the foregoing construction. For example, the reaching detection portion 17 may detect that at least one of the seat cushion 23 and the seatback 22 reaches the second predetermined position during the state change of the seat 2, and the determination threshold value changing portion 20 may temporarily change the predetermined determination threshold value for detecting whether the seat cushion 23 and/or the seatback 22 entraps an object or a part of occupant's body from when at least one of the seat cushion 23 and the seatback 22 reaches the second predetermined position at least until the cooperating member (e.g., headrest member 21), which changes its states in cooperation with at least one of the seat cushion 23 and the seatback 22, starts moving.

According to the embodiment, the seat state changing apparatus 1 changes the positional states of the seat 2 from the stored state to the seatable state. However, the construction of the seat state changing apparatus 1 is not limited to the foregoing construction. For example, the seat state changing apparatus 1 may be configured to change the positional states of the seat 2 between the first state and the second state. In those circumstances, an actuator may be provided for moving the seat 2 between the first state and the second state. Further, the change detection portion 16 may detect changes in the pulse signal in accordance with applied loads when the load is applied to the seat 2 during the positional state change. Further, the seat state changing apparatus 1 may include the determination portion 19 which determines that the seat 2 is in a predetermined state when an amount of change according the changes in accordance with the applied loads is greater than the predetermined determination threshold value. In those circumstances, the determination threshold value changing portion 20 may change the determination threshold value when the engaging member 18 comes to engage with the seat 2 during the movement of the seat 2 between the first state and the second state. The engagement of the engaging member 18 with the seat 2 may be determined (recognized) by detecting the position of the seat 2 based on pulse signals outputted from the actuator.

Further, the seat 2 may include plural seat blocks and the positional states of the seat 2 may be changed between the first state and the second state by actuating at least one of the plural seat blocks by the actuator.

The engaging member (e.g., operational lever) 18 may cooperate with the cooperating member (e.g., headrest 21) which changes its positional state in cooperation with the seat 2. Further, the seat state changing apparatus 1 may include the state change detection portion 15b which detects that the engaging member (e.g., operational lever) 18 changes its states. In those circumstances, the determination threshold value may be changed while the engaging member (e.g., operational lever) 18 is changing its positional state. That the engaging member (e.g., operational lever) 18 has changed its states or engaging member (e.g., operational lever) 18 is changing its states may be determined (recognized) by detecting the position of each of the seat blocks based on pulse signals outputted from the actuator.

Further, according to the embodiment, the change detection portion 16 detects the changes in accordance with the loads which is applied to the seat 2 based on the information in response to the actuation of the actuator. The plural seat blocks may include the seat 23 and the seatback 22.

In those circumstances, the first position (first state) may correspond to the stored position where the seat cushion 23 and the seatback 22 are at the stored state, the second position (second state) may correspond to the seatable state where the seat cushion 23 and the seatback 22 are at the seatable state, and the actuator may include the seat cushion actuator 14 which moves the seat cushion 23 between the stored position and the seatable position and the seatback actuator 13 which moves the seatback 22 between the stored position and the seatable position. Further, the predetermined state mentioned above may be the state where an object or a part of occupant's body is entrapped.

As an example of the foregoing construction, according to the embodiment, the seat 2 includes the seat cushion 23 and the seatback 22 serving as the plural seat blocks and the seat 2 changes its states between the stored state (i.e., first state) where the seat cushion 23 and the seatback 22 are at the stored position and the seatable state (i.e., second state) where the seat cushion 23 and the seatback 22 are at the seatable position. The seat cushion 23 is movable between the stored position and the seatable position by the seat cushion actuator 14. The seatback 22 is movable between the stored position and the seatable position by the seatback actuator 13.

When at least one of the seat cushion 23 and the seatback 22 receives a load when changing the seat states of the seat 2, the change detection portion 16 detects a change in accordance with the applied load. The load, which at least one of the seat cushion 23 and the seatback 22 receives, is a load detected because an object or a part of occupant's body is entrapped by the seat cushion 23 or the seatback 22. The changes in accordance with the applied load correspond to changes in levels of the load applied to the seat cushion 23 and the seatback 22. The change detection portion 16 detects each of a load applied to the seat cushion 23 and the seatback 22 individually.

The change detection portion 16 detects the change in the levels of the load applied to the seat cushion 23 and the seatback 22 based on the pulse signal detected by the position detection portion 15. A time keeping a Hi level of the pulse signal (a time duration of the Hi-level pulse signal) when an object or a part of occupant's body is entrapped by the seat cushion 23 or the seatback 22 is assumed to be longer than a time keeping a Hi level of the pulse signal (a time duration of the Hi-level pulse signal) when there is no entrapped object or part of occupant's body. Further, motor rotation speed of the motor which is associated with the entrapped object or part of occupant's body declines. The change detection portion 16 detects the foregoing changes. The changes detected by the change detection portion 16 are transmitted to the entrapment determination portion 19 explained in details hereinafter.

The entrapment determination portion 19 determines that an object or a part of occupant's body is entrapped when a amount of change according to the changes is greater than a predetermined determination threshold. The amount of change according to the changes corresponds to an amount of change of the changes detected by the change detection portion 16. The predetermined determination threshold corresponds to determination threshold values which is used for determining whether the object or part of occupant's body is entrapped, and a determination threshold value for detecting the entrapment by the seatback 22 and a determination threshold value for detecting the entrapment by the seat cushion 23 are pre-memorized in the entrapment determination portion 19. The entrapment determination portion 19 determines that the object or part of occupant's body is entrapped when the amount of change is greater than the determination threshold value. On the other hand, when the amount of change is equal to or less than the determination threshold value, the entrapment determination portion 19 determines that no object or part of occupant's body is entrapped. In those circumstances, among the changes transmitted from the change detection portion 16, the changes because of the movement of the seatback 22 and the changes because of the movement of the seat cushion 23 are separately transmitted. Accordingly, the entrapment determination portion 19 determines that the object or part of occupant's body is entrapped either one of or both of the seatback 22 and the seat cushion 23.

The operational lever 18 (i.e., serving as an engaging member) which is configured to engage with the seat cushion 23 is provided in association with the movement of the seat 2, that is, the movement of the seatback 22 and the seat cushion 23 between the stored state and the seatable state. Whether the operational lever 18 and the seat cushion 23 are engaged is determined (recognized) by detecting the position of the seat cushion 23 on the basis of pulse signals outputted from the seat cushion actuator 14. When the seat cushion 23 and the operational lever 18 are engaged, the determination threshold value changing portion 20 changes the determination threshold value of the entrapment determination portion 19 from the determination threshold value Th0 to the determination threshold value Th1.

According to the embodiment, when the engaging member (the trigger position reaching detection portion; operational lever) 18 comes to engage with the seat 2, the determination threshold value changing portion 20 changes the predetermined threshold value. Thus, in a case where a predetermined state is established when the engaging member (the trigger position reaching detection portion; operational lever) 18 comes to engage with the seat 2, erroneous detection that the predetermined state is established because the seat 2 receives a load is avoided. Further, because the detection of the load is not completely discontinued, even if an object or a part of occupant's body is entrapped by the seat 2 during the states change of the seat 2, the movement of the seat 2 is appropriately stopped by controlling the actuator (seatback actuator, seat cushion actuator) 13, 14.

According to the embodiment, the seat 2 includes the plural seat blocks (seatback, seat cushion) 22, 23 and the seat states are changed between the first state and the second state by operating at least one of the plural seat blocks (seatback, seat cushion) 22, 23 by the actuator (seatback motor, seat cushion motor) 13, 14.

According to the constructions of the embodiment, the seat state of the seat 2 is appropriately changed.

According to the embodiment, the engaging member (trigger position reaching detection portion, operational lever) 18 cooperates with a cooperating member (e.g., headrest) 21 which changes states thereof in cooperation with the states change of the seat 2.

According to the constructions of the embodiment, the state of the cooperating member (e.g., headrest 21) is appropriately changed. According to the embodiment, the seat state changing apparatus further includes a state change detection portion (seat cushion position detection portion) 15b detecting that the cooperating member (e.g., headrest) 21 is in a process of changing states.

According to the constructions of the embodiment, the state of the cooperating member (e.g., headrest 21) is appropriately changed.

According to the embodiment, the predetermined determination threshold value is changed during the states changing process of the cooperating member (e.g., headrest 21).

According to the constructions of the embodiment, an erroneous detection of the entrapment based on the load detected in response to the states change of the cooperating member (e.g., headrest 21) is avoided.

According to the embodiment, the change detection portion 16 detects the change according to the load applied to the seat based on information in association with an operation of the actuator (seatback motor, seat cushion motor) 13, 14.

According to the constructions of the embodiment, that the seat 2 receives the load is appropriately detected.

According to the embodiment, the plural seat blocks include the seat cushion 23 and the seatback 22.

According to the constructions of the embodiment, the seat states of the seat 2 including the seat cushion 23 and the seatback 22 is appropriately changed.

According to the embodiment, the first state corresponds to the stored state where the seat cushion 23 and the seatback 22 are at respective stored positions and the second state corresponds to a seatable state where the seat cushion 23 and the seatback 22 are at respective seatable positions. Further, the actuator includes the seat cushion actuator 14 for moving the seat cushion 23 between the stored position and the seatable position, and the seatback actuator 13 for moving the seatback 22 between the stored position and the seatable position.

According to the constructions of the embodiment, the seat state of the seat 2 is appropriately changed to the seatable state and to the stored state.

According to the embodiment, the predetermined state of the seat corresponds to a state where the seat 2 entraps an object or a part of occupant's body.

According to the constructions of the embodiment, that an object or a part of occupant's body is entrapped is appropriately detected.

According to the embodiment, the seat state changing apparatus changing states of the seat 2 including the seat cushion 23 and the seatback 22 between the stored state and the seatable state, includes the seat cushion actuator 14 moving the seat cushion 23 between the stored state and the seatable state, the seatback actuator 13 moving the seatback 22 between the stored state and the seatable state, the change detection portion 16 detecting a change according to a load applied to at least one of the seat cushion 23 and the seatback 22 when changing seat states, the entrapment determination portion 19 determining that at least one of the seat cushion and the seatback entraps an object or a part of occupant's body when an amount of change in accordance with the change according to the load applied to the seat is greater than the predetermined determination threshold value, the reaching detection portion 17 detecting that at least one of the seat cushion 23 and the seatback 22 reaches the predetermined portion when changing the seat states, and the determination threshold value changing portion 20 temporarily changing the predetermined determination threshold value for detecting whether at least one of the seat cushion and the seatback entraps the object or the part of occupant's body from when at least one of the seat cushion 23 and the seatback 22 reaches the predetermined position until the cooperating member (e.g., headrest) 21, which changes states thereof in cooperation with at least one of the seat cushion 23 and the seatback 22, starts moving.

According to the constructions of the embodiment, when the cooperating member (e.g., headrest 21), which changes states thereof in cooperation with the movement of the seat cushion 23, starts moving, the predetermined determination threshold value is changed by the determination threshold value changing portion 20. Thus, even if a load is detected in response to the movement of the cooperating member (e.g., headrest 21), an erroneous detection that the load corresponds to a load applied because of an entrapment of an object or a part of occupant's body is avoided. Further, because the detection of the entrapment of the object or the part of occupant's body is not completely discontinued, even if the seat cushion 23 entraps an object or a part of occupant's body, the movement of the seat 2 is appropriately stopped by controlling the seat cushion actuator (seat cushion motor) 14 and the seatback actuator (seatback motor) 13.

According to the embodiment, the determination threshold value changing portion 20 temporarily changes the predetermined determination threshold value from when detecting that the seat cushion at least reaches the predetermined position until state change of the cooperating member (e.g., headrest 21) is completed.

According to the constructions of the embodiment, even if the seatback 22 and the seat cushion 23 receives loads while the cooperating member (e.g., headrest 21) is moving or when the movement of the cooperating member (e.g., headrest 21) is completed, an erroneous detection that an object or a part of occupant's body is entrapped based on the received loads is avoided.

According to the embodiment, the determination threshold value changing portion 20 re-changes the determination threshold value to the predetermined determination threshold value after the completion of the state change of the cooperating member (e.g., headrest) 21.

According to the constructions of the embodiment, because a load is not detected in response to a movement of the cooperating member (e.g., headrest 21) after the cooperating member (e.g., headrest 21) completes states change thereof, sensitivity for the detection of the entrapment is enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat state changing apparatus changing seat states between a first state and a second state, comprising:
    an actuator moving a seat between the first state and the second state;
    a change detection portion detecting a change according to a load applied to the seat when changing seat states;
    a determination portion determining that the seat is assumed to be a predetermined state when an amount of change in accordance with the change according to the load applied to the seat is greater than a predetermined determination threshold value; and
    a determination threshold value changing portion changing the predetermined determination threshold value when an engaging member, which is configured to engage with the seat, engages with the seat during a movement of the seat between the first state and the second state.

2. The seat state changing apparatus according to claim 1, wherein
    the seat includes a plurality of seat blocks; and wherein
    the seat states are changed between the first state and the second state by operating at least one of the plural seat blocks by the actuator.

3. The seat state changing apparatus according to claim 2, wherein the plurality of seat blocks include a seat cushion and a seatback.

4. The seat state changing apparatus according to claim 3, wherein
    the first state corresponds to a stored state where the seat cushion and the seatback are at respective stored positions;
    the second state corresponds to a seatable state where the seat cushion and the seatback are at respective seatable positions; and
    the actuator includes a seat cushion actuator for moving the seat cushion between the stored position and the seatable position, and a seatback actuator for moving the seatback between the stored position and the seatable position.

5. The seat state changing apparatus according to claim 1, wherein the engaging member cooperates with a cooperating member which changes states thereof in cooperation with the states change of the seat.

6. The seat state changing apparatus according to claim 5, further comprising a state change detection portion detecting that the cooperating member is in a process of changing states.

7. The seat state changing apparatus according to claim 5, wherein the predetermined determination threshold value is changed during the states changing process of the cooperating member.

8. The seat state changing apparatus according to claim 1, wherein the change detection portion detects the change according to the load applied to the seat based on information in association with an operation of the actuator.

9. The seat state changing apparatus according to claim 1, wherein the predetermined state of the seat corresponds to a state where the seat entraps an object or a part of occupant's body.

10. A seat state changing apparatus changing states of a seat including a seat cushion and a seatback between a stored state and a seatable state, comprising:
    a seat cushion actuator moving the seat cushion between the stored state and the seatable state;
    a seatback actuator moving the seatback between the stored state and the seatable state;
    a change detection portion detecting a change according to a load applied to at least one of the seat cushion and the seatback when changing seat states;
    an entrapment determination portion determining that said at least one of the seat cushion and the seatback entraps an object or a part of occupant's body when an amount of change in accordance with the change according to the load applied to the seat is greater than a predetermined determination threshold value;
    a reaching detection portion detecting that said at least one of the seat cushion and the seatback reaches a predetermined portion when changing the seat states; and
    a determination threshold value changing portion temporarily changing the predetermined determination threshold value for detecting whether said at least one of the seat cushion and the seatback entraps the object or the part of occupant's body from when said at least one of the seat cushion and the seatback reaches a predetermined position until a cooperating member, which changes states thereof in cooperation with said at least one of the seat cushion and the seatback, starts moving.

11. The seat state changing apparatus according to claim 10, wherein the determination threshold value changing portion temporarily changes the predetermined determination threshold value from when detecting that the seat cushion at least reaches the predetermined position until state change of the cooperating member is completed.

12. The seat state changing apparatus according to claim 10, wherein the determination threshold value changing portion re-changes the determination threshold value to the predetermined determination threshold value after the completion of the state change of the cooperating member.

* * * * *